United States Patent [19]

Forchini et al.

[11] 3,995,332

[45] Dec. 7, 1976

[54] FIN TUBE SEAL

[75] Inventors: James Franklin Forchini; Joseph Michael Schwinn, both of Healdsburg, Calif.

[73] Assignee: Ecodyne Corporation, Lincolnshire, Ill.

[22] Filed: May 8, 1975

[21] Appl. No.: 575,893

[52] U.S. Cl. .................................. 4/187 R; 277/178; 277/212 F; 277/215; 277/225

[51] Int. Cl.$^{2}$ .................................. E03C 1/00

[58] Field of Search ............... 277/178, 215, 212 F, 277/225, 212 R, 237; 4/187 R

[56] References Cited

UNITED STATES PATENTS

| | | | |
|---|---|---|---|
| 1,928,361 | 9/1933 | Muchnic | 277/178 |
| 2,670,976 | 3/1954 | Owen | 277/212 F |
| 2,897,533 | 8/1959 | Bull et al. | 277/178 |
| 3,424,857 | 1/1969 | Miller et al. | 277/178 |
| 3,621,952 | 11/1971 | Long | 277/178 |

*Primary Examiner*—Richard E. Aegerter
*Assistant Examiner*—L. Footland
*Attorney, Agent, or Firm*—Joel E. Siegel

[57] ABSTRACT

An improved sealing means for securing a fin tube heat exchange element to the floor of a heat exchanger or cooling tower hot water basin. The sealing means includes a first collar section received around the fin tube and a second collar section received around an opening in the hot water basin floor. A compliant web section connects together the first and second collar sections. Gusset reinforcement members are provided to the web section to reduce twist and prevent seal leakage. Small circumferential grooves are provided in the portion of the second collar section which seals against the basin floor to effect a positive seal. The opening in the basin floor is large enough to permit the effortless vertical extraction of the fin tube element.

5 Claims, 5 Drawing Figures

FIN TUBE SEAL

BACKGROUND AND SUMMARY OF THE INVENTION

The present invention relates to an improved sealing means for securing fin tube heat exchange elements to the floor of a hot water basin pan in a heat exchanger or cooling tower.

The sealing means of the present invention is contemplated for use in combination with various types of heat exchange equipment which employ a hot water basin into which the upper ends of vertical heat exchange elements extend for receipt of the water to be cooled therethrough. Such equipment may include only a dry cooling section or may include a wet cooling section in combination therewith. Further such equipment may include mechanical means or a natural draft means for causing cooling air to be directed across the heat exchange tubes. By way of example, the sealing means is disclosed in combination with a mechanically assisted wet/dry cooling tower.

Accordingly, it is a primary object of the present invention to provide a sealing means for effecting a leakproof seal at the interface of the floor of the hot water basin pan and the vertical fin tube heat exchanger element.

Another object is to provide such a sealing means which permits relative motion between the heat exchanger tube and the hot water basin floor to enable the fin tube element to be self-centering.

A further object of the present invention is to provide such a sealing means which permits effortless vertical extraction of the fin tube element for either replacement of the seal or the fin tube.

The sealing means in accordance with the invention includes a first collar section received around the fin tube and a second collar section received around the opening in the hot water basin floor. A compliant web section connects together the first and second collar sections. Gusset reinforcement members are provided to the web section to reduce twist and prevent seal leakage. Small circumferential grooves are provided in the portion of the second collar section which seals against the basin floor to effect a positive seal in the presence of very low pressure heads. The opening in the basin floor is large enough to permit the effortless vertical extraction of the fin tube element.

BRIEF DESCRIPTION OF THE DRAWINGS

Other objects and many of the attendant advantages of this invention will be readily appreciated as the same becomes better understood by reference to the following detailed description, when considered in connection with the accompanying drawings in which.

DESCRIPTION OF THE PREFERRED EMBODIMENT

Figure 1:
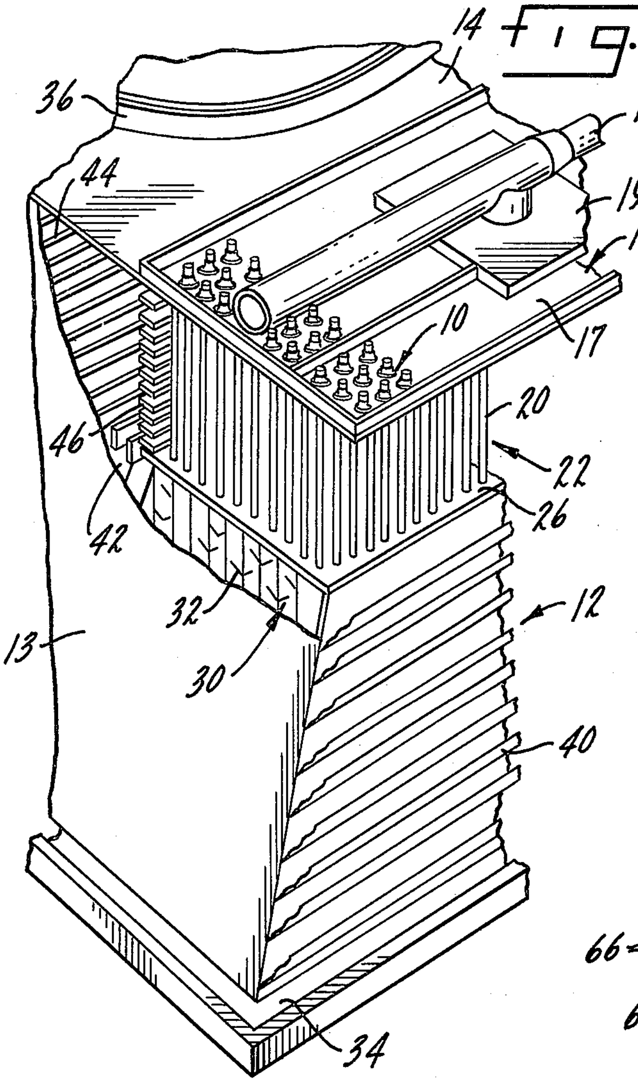
FIG. 1 is a perspective view of a portion of an exemplary wet/dry cooling tower of a type contemplated for use with the sealing means of the present invention.
Figure 2:
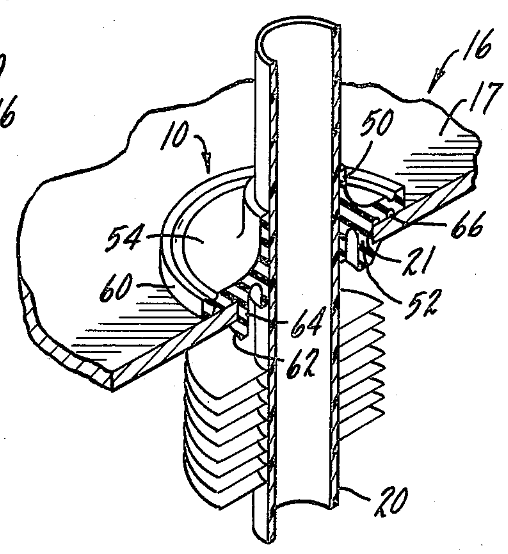
FIG. 2 is an enlarged perspective view taken through one of the heat exchange tubes in FIG. 1 showing the construction of the sealing means in accordance with the present invention.
Figure 3:
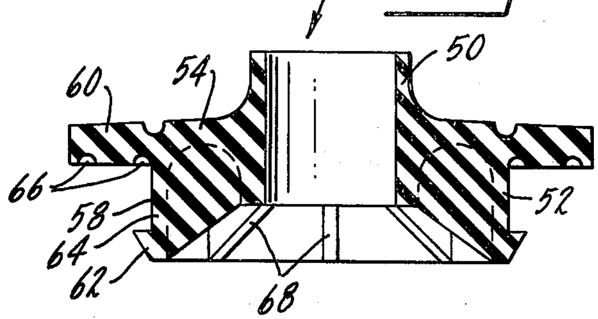
FIG. 3 is a vertical section taken through the sealing means of the present invention.

Referring to FIGS. 1 and 2, the sealings means 10, constructed in accordance with the present invention, is shown in combination with a wet/dry cooling tower 12 for purposes of giving an exemplary environmental context to the invention. It should be understood, however, that the sealing means of the present invention is intended for use in other types of cooling equipment which include fin tube elements extending upward into a hot water distribution basin.

Referring to FIG. 1, a portion of an exemplary wet/dry cooling tower is indicated generally at 12. Tower 12 includes a housing 13 incorporating a top deck 14 defining a hot water distribution basin 16. Liquid, such as water to be cooled, is pumped into basin 16 through distribution pipe 18 and distribution box 19. Positioned immediately below basin 16 is a dry cooling section 22 which includes a plurality of vertically disposed plastic heat exchange tubes 20. Tubes 20 are arranged in a plurality of transversely extending rows and mounted between a floor 17 of basin 16 and a horizontal partition deck 26. The upper ends of the tubes 20 extend through corresponding openings 21 in floor 17. Liquid from basin 16 flows downward through tubes 20 for distribution over a wet cooling section 30 positioned immediately therebelow. After descending through fill or packing 32, supported within wet section 30, the cooled liquid is collected in a cold water collection basin 34 for removal to service.

Ambient cooling air is drawn laterally through the tower by a fan (not shown) rotating in fan stack 36. The air passes successively through openings between inlet louvers 40, which are separately associated with both dry section 22 and wet section 30, and then through the respective dry and wet sections 22 and 30. The exhaust air from dry section 22 and wet section 30 are mixed in plenum area 42 prior to discharge from the tower via stack 36 to the atmosphere. Movable louver assemblies 44 and 46 may be provided to permit control of the ratio of air mix in the plenum area 42 which emanates from the dry and wet sections.

Referring to FIGS. 2–5, the sealing means 10 in accordance with the present invention is an integrally formed neoprene gasket type seal including a first collar section 50, a second collar section 52, and a compliant web section 54. First collar section 50 is of tubular shape and has inner diameter slightly less than the outer diameter of the tube 20 to cause a positive seal therearound. Second collar section 54 is of annular shape and includes a annular recess 58 formed therein which is sized to snuggly receive the peripheral edges of a corresponding opening 21 in floor 17. Recess 58 is defined by an upper annular flange portion 60 which seals against the upper surface of floor 17, a lower lip portion 62 which seals against the lower surface of floor 17, and a connecting portion 64 extending between the flange 60 and lip 62 in sealing contact with the peripheral edge of opening 21. A pair of circumferential grooves 66 are formed in flange 60 to increase the compliance of the flange 60. The outer edge of lip 62 is bevelled upward and outward to facilitate its passage through opening 21.

Figure 4:
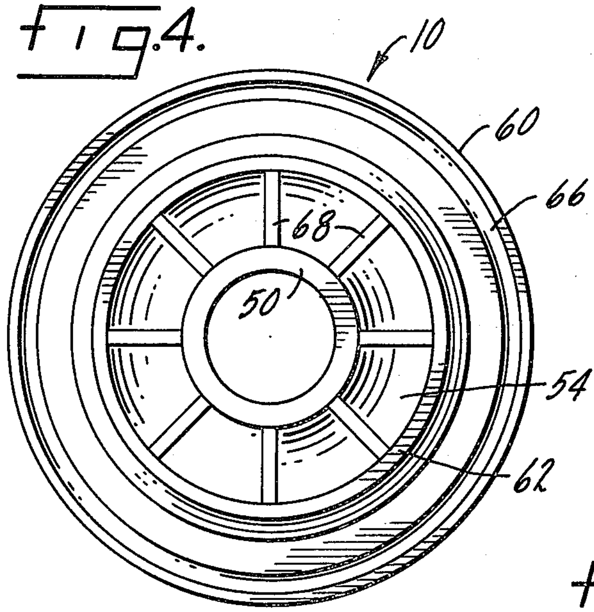
FIG. 4 is a bottom plan view of the sealing means in FIG. 3 prior to its installation around a heat exchange tube.
Figure 5:
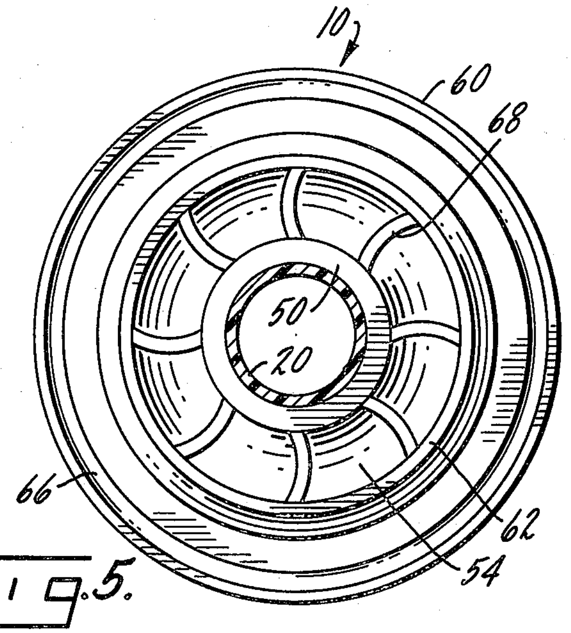
FIG. 5 is a bottom plan view of the sealing means in FIG. 4 after its installation around a heat exchange tube.

The compliant web section 54 extends between and connects the first collar section 50 to the second collar section 52. Web 54 includes a plurality of radial gussets 68 formed integral therewith the preventing twisting or buckling of collar sections 50 and 52. Referring to FIGS. 4 and 5, it can be seen that gussets 68 are caused to deflect upon installing the sealing means 10 around the heat exchange tube 20.

While essentially a static seal, sealing means 10, constructed in accordance with the present invention, is designed to permit relative motion between the tube 20 and the basin floor 17. Allowance for this displacement permits the tube 20 to be self centering in the opening 21. Another unique feature of this design is realized by the ease of replacement of either the sealing means 10 or the tube 20. Sealing means 10 permits the opening 21 in floor 17 to be large enough to permit the effortless vertical extraction of tube 20 therethrough. Further, sealing means 10 effects a leakproof seal in a unique manner at the interface of the basin floor 17 and the tube element 20. The collar portion 50 seals against the tube 20 essentially through elasticity of the seal against the tube outer wall. This elastic force is in turn aided by the resultant force of the water pushing from above and round when submerged. The collar portion 52 also seals against the opening 21 in floor 17 by a combination of elastic plus water loading forces. The presence of the small circumferential grooves 66 increases the compliance of the flange 60 and makes possible a positive seal even in the presence of very low pressure heads. The gussets 68 serve to exert additional sealing forces on both sealing collars 50 and 52 upon installation around the tube. The gussets 68 also reduce twist or buckling of the collars 50 and 52 which might cause leakage at either the wall of tube 20 or at the opening 21 in floor 17. Additionally, the gussets also resist the axial toroidal moment that tends to twist or roll the sealing means 10 down the tube 20, especially during heavy water loading from above due to high basin water head.

Various modifications are contemplated and may obviously be resorted to by those skilled in the art without departing from the spirt and scope of the invention, as hereinafter defined by the appended claims, as only a preferred embodiment thereof has been disclosed.

What is claimed is:

1. A hot water distribution basin; comprising:
- a. a basin floor;
- b. a vertical heat exchange element extending upwardly through an opening in said basin floor; and
- c. sealing means for effecting a leakproof seal at the interface between said basin floor and said heat exchange element, said sealing means including:
  - i. a first collar section received around and in contact with said heat exchange element;
  - ii. A second collar section received within said opening in said basin floor;
  - iii. a substantially horizontal compliant web section connecting said first collar section and said second collar section; and
  - iv. a plurality of flexible gussets formed integrally with said compliant web section and extending between said first collar section and said second collar section.

2. The invention as defined in claim 1 wherein said opening in said basin floor is sized to permit said heat exchange element to pass therethrough.

3. The invention as defined in claim 1 wherein said second collar section includes an upper annular flange portion which seals against the upper surface of said basin floor around said opening, a lower lip portion which seals against the lower surface of said basin floor around said opening, and an annular connecting portion extending between said upper flange portion and said lower lip portion in sealing contact with the peripheral edge of said opening.

4. The invention as defined in claim 3 wherein said upper flange portion have circumferential grooves formed therein about the surface in contact with said basin floor.

5. The invention as defined in claim 4 wherein the outer edge of said lower lip is bevelled upward and outward to facilitate its passage through said opening.

* * * * *